Jan. 11, 1944.  W. J. CHAPMAN  2,338,703
RADIO RANGE VISUALIZING DEVICE
Filed April 8, 1942  3 Sheets-Sheet 1
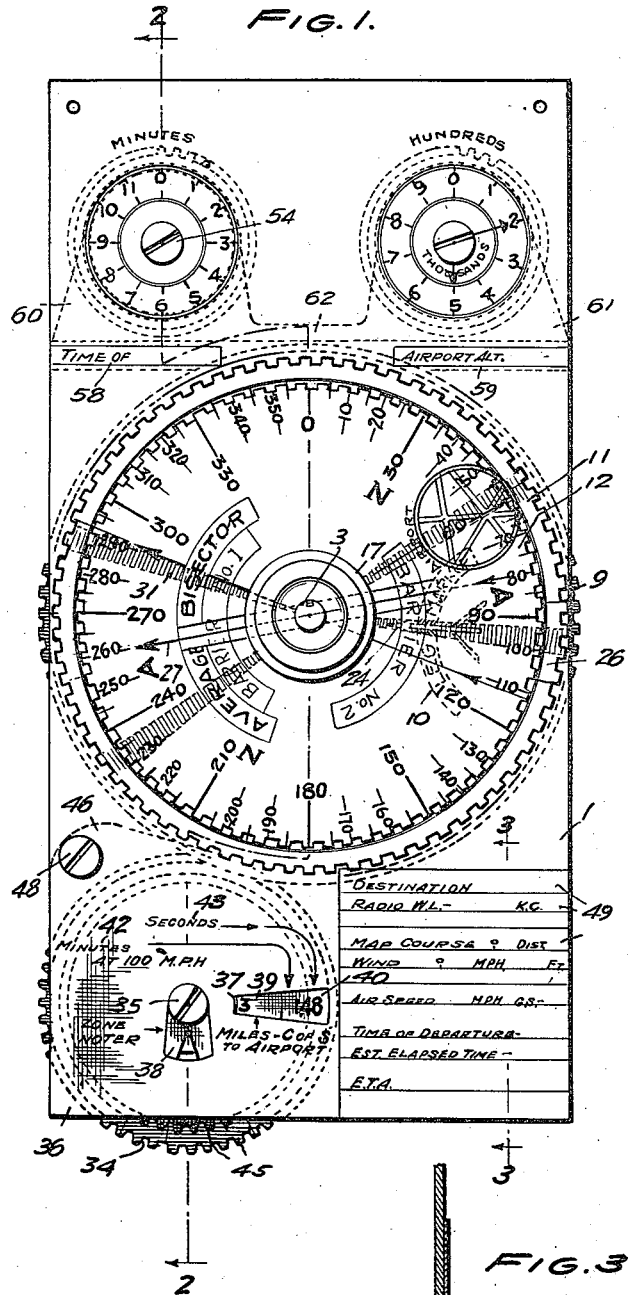
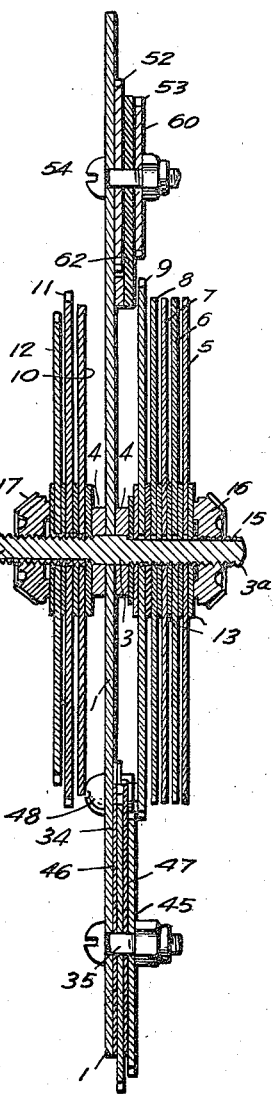
INVENTOR
WILLIAM J. CHAPMAN
BY
ATTORNEYS Jan. 11, 1944. W. J. CHAPMAN 2,338,703
RADIO RANGE VISUALIZING DEVICE
Filed April 8, 1942 3 Sheets-Sheet 2
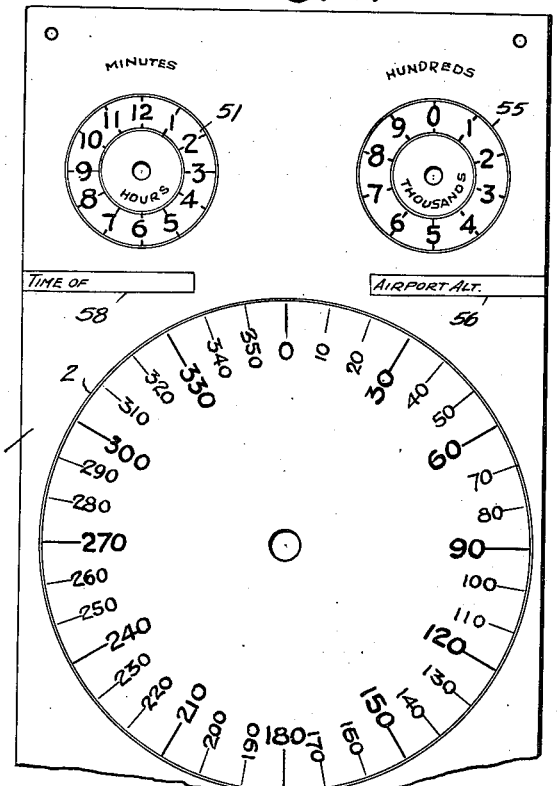
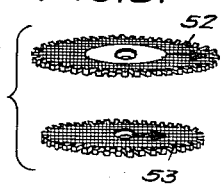
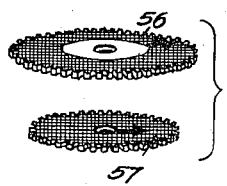
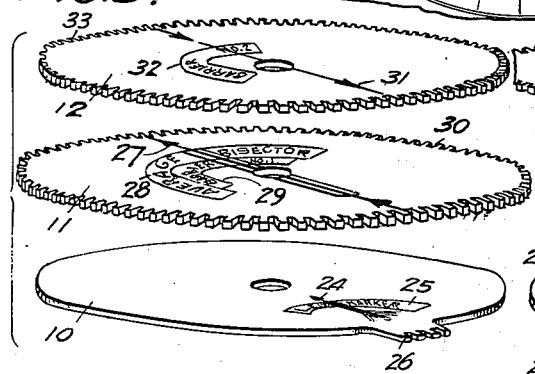
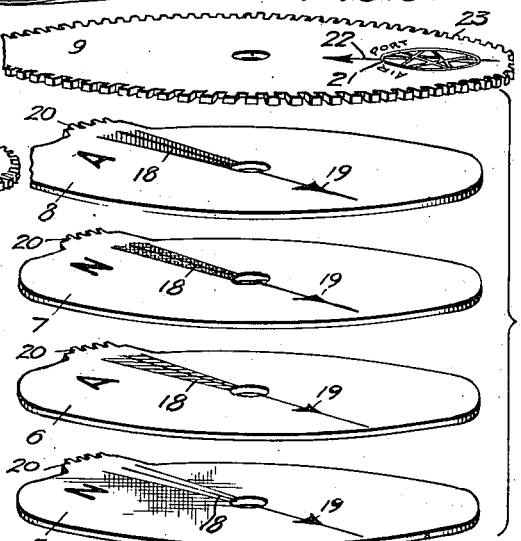
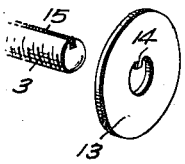
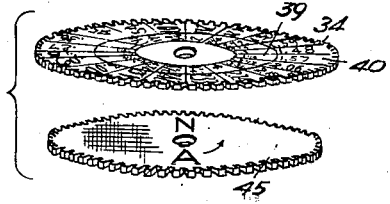
INVENTOR
WILLIAM J. CHAPMAN
BY
ATTORNEYS

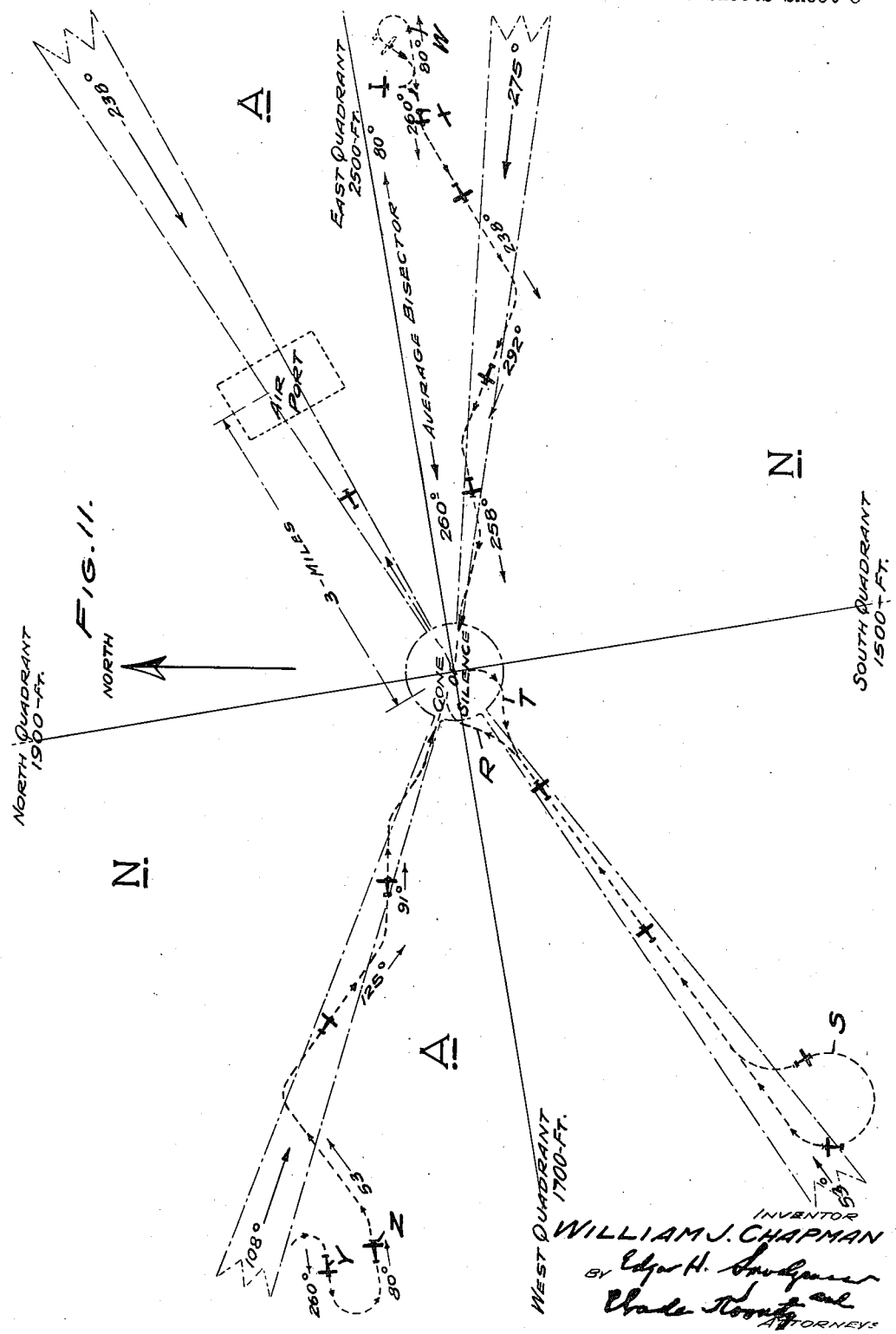

Patented Jan. 11, 1944

2,338,703

UNITED STATES PATENT OFFICE 2,338,703

RADIO RANGE VISUALIZING DEVICE

William J. Chapman, Lake Charles, La.

Application April 8, 1942, Serial No. 438,097

8 Claims. (Cl. 116—133)

(Granted under the act of March 3, 1883, as amended April 30, 1928; 370 O. G. 757)

The invention described herein may be manufactured and used by or for the Government for governmental purposes, without the payment of me of any royalty thereon.

This invention relates to a radio range visualizing device and the object of the invention is to provide simple and convenient means whereby an airplane pilot, who is flying by instrument and using a radio beam as a method of ascertaining his position along a given flight track, is able to set up a pattern or representation of any given beam station and to visualize his position on the range system while solving problems of orientation and method of approach.

Another object of the invention is to provide a device of the above described character which is so constructed and designed as to give the pilot not only a complete picture of his orientation problem with respect to the beam station of the range system within which he is flying but also the information and means with which to solve the problem. The only extraneous requirement is a radio facilities chart showing, among other things, the different leg settings for the various beam stations of the radio range system and the direction of the airport and the distance in miles from the cone of silence. This information is set up on the device of the invention by components especially designed for that purpose.

A further object of the invention is to provide a radio range visualizing device in which an airport locator is combined with a distance-time indicator which, upon being operated, gives the distance of the airport from the beam station, as measured from the cone of silence, and automatically resolves that distance into minutes and seconds from the station at a given airspeed.

A still further object of the invention is to provide a radio range visualizing device in which means are provided for visually setting up beam-bracketing courses to thereby enable a pilot to conveniently and readily establish narrow working limits within which to hold heading corrections for staying on the beam.

Additional objects of the invention are to provide a radio range visualizing device which: (a) lends itself most readily for use in conjunction with the system of airplane instrument lighting now in general use in Air Corps airplanes; (b) is pocket size for convenient carrying on the person; (c) contains a visual reference altimeter, clock, zone noter, and log-sheet on which pertinent data can be set and (d) is mechanically simple in construction, operation and design.

The above stated objects, as well as the novel features, of the invention will be apparent from the following detailed description thereof and from the accompanying drawings, wherein—

Figure 1 is a top plan view of the assembled device.

Figure 2 is a longitudinal section on line 2—2 of Figure 1.

Figure 3 is a section on line 3—3 of Figure 1.

Figure 4 is a top plan view of the instrument panel with the indicator disks removed to expose the compass rose.

Figure 5 is a detail view, in perspective, of the disks comprising one group of indicators.

Figure 6 is a detail view, in perspective, of the disks comprising another group of indicators.

Figure 7 is a detail view, in perspective, of the disks of the zone-noter and distance-time indicator.

Figure 8 is a detail view, in perspective, of the clock disks.

Figure 9 is a detail view, in perspective, of the altimeter disks.

Figure 10 is a detail perspective view of one of the keyed washers and a slotted portion of the shaft, and Figure 11 is a schematic view of a conventional radio range station in which the various positions of the airplane during orientation and approach procedures are indicated.

The various units of the device are supported on, and approximately within the dimensions of, a relatively thin panel 1 of substantially stiff transparent material and restricted to an overall size adapted the device to be conveniently carried in a pocket of the pilot's apparel. The panel, as shown in detail in Figures 1 and 3, is inscribed over a substantially central area of one face thereof with a compass scale 2 for reading the bearings into and out of a radio range beacon station; the cone of silence of which station is considered as being at the center of the scale. A relatively short shaft or pin 3 is secured to the panel 1 at the center of the scale, by suitable means 4, and extends outwardly of opposite faces of the panel for short distances. This shaft serves as a fulcrum or pivot for a plurality of centrally apertured and independently rotatable indicator or marker disks, 5 through 12, of transparent material similar to that of the panel. The disks are suitably separated by thin washers or spacers 13, each of which is provided with a key 14 engaged in a slot 15 in the shaft whereby it is initially slidable but non-rotatable on the shaft. The disks and spacers are maintained in frictional contact, one with another, by means of nuts 16 and 17 on relatively opposite threaded ends of the pivot member 3. The adjustments of these nuts will be such as to cause the spacers to exert a braking effect on the disks sufficient to permit readily manual rotation of the disks about the pivot member, as when setting the disks in given positions, and to frictionally held them in place after they have been so positioned.

Disks 5 through 9 are grouped on the underside or rear face of the transparent panel 1, being rotatably supported on the rearward extension 3a of the pivot member. Four of these disks, represented at 5, 6, 7 and 8, respectively, constitute settable beam-leg indicators and the remaining disk, represented at 9, serves as an airport direction indicator or locator. Each beam-leg indicator disk is provided with a radially extending wedge-shaped marking 18 representing a beam or leg of a radio range station and is further marked with a radially extending arrow 19 to facilitate setting the leg to a given bearing, the leg and arrow being diametrically aligned, one with the other. Disks 5 and 7 are marked with the letter N and disks 6 and 8 are marked with the letter A. These letters identify the quadrants of the range in which the "N" and "A" signals are heard. Each beam-leg indicator disk is provided with suitable means, such as a toothed projection or tab 20, whereby it is turned manually to a desired setting. An airport is conventionally represented on the airport locator disk 9 by suitable markings 21 remote from the axis of the disk and including a radial center-line 22 readable against the graduations of the compass scale 2 in setting the airport 21 to the bearing corresponding to a given location of the airport with respect to the range station. The means whereby the disk 9 is turned manually to a desired setting is preferably distinguished from the corresponding means 20 of the disks 5 through 8 to facilitate its adjustment without confusion with or disturbance of the other disks. To this end, the peripheral edge of the disk 9 is shown indented or notched to provide tooth-like projections 23.

Disks 10 through 12 are grouped on the topside or front face of the transparent panel 1 and rotatably supported on the forward extension 3b of the pivot member. The innermost disk 10 of the group has inscribed or otherwise provided thereon adjacent its edge a short radially disposed winged arrow 24 pointing toward the center of the disk which is synonymous with the cone of silence of the range station representation. This arrow is used to mark the instant leg of the range with respect to which the pilot is working out a problem of orientation or approach procedure and is advantageous in relieving the pilot of the necessity of keeping in mind the instant leg and in reducing to a minimum the likelihood of confusion and error. This leg marker disk 10 is adequately identified by a suitable legend 25 and is provided with suitable means, such as a toothed tab 26, to facilitate manual rotating. The intermediate disk 11 has a double function in that it is used as a quadrant average-bisector indicator and also as the primary one of the two barrier-indicators which are used for setting up limiting headings in bracketing a beam. The markings on the average bisector-barrier disk 11 comprise an elongated winged arrow 27 extending diametrically of the disk substantially for the full distance, and appropriate legends 28 and 29. Tooth-like projections 30 are provided on the peripheral edge of the average bisector-barrier disk 11 to facilitate the manual adjustment thereof. The outermost disk 12 constitutes the second barrier-indicator and is marked with a diametrically extending winged arrow 31 and an appropriate legend 32. To facilitate the manual adjustment of the disk 12, the peripheral edge thereof is provided with tooth-like projections 33 and the diameter of the disk is slightly less than the diameter of the subjacent disk 11.

The average bisector-barrier disk 11 and the second barrier disk 12 enable the pilot to visually set his courses in relation to the beam legs and thus properly and quickly to get on the leg desired. By means of these disks, a pilot can set up a visual barrier consisting of two courses which bracket the beam and which establish limiting headings or narrow working limits within which to hold heading corrections for staying on the beam, as hereinafter more fully explained.

The markings on each lower disk in the group below the panel are clearly visible through the transparent material of every preceding disk in the group as well as through the transparent material of the panel and of every disk in the group above the panel. In like manner, the markings on every lower disk in the top group are visible through the transparent material of every higher disk. The bottom or lowermost disk 5 of the entire series preferably is provided on its bottom face with an opaque coating in contrast to and forming a background for the markings on the disks and panel whereby the markings are readily distinguishable. It will be observed that when the various parts of the device are completely assembled, as shown in Figure 1, that all graduations on the compass scale are at all times visible.

As a feature of much importance in aiding a pilot to reach the airport, the panel 1 is provided with a distance-time indicator for use in conjunction with the airport locator disk 9. The bearing of the airport from the range station and its location relative to the beams or legs of the station is visibly represented by the proper setting of the disk 9 and the distance of the airport from the beam station (cone of silence) is set up on the indicator which automatically resolves that distance into minutes and seconds of time from the station a a given airspeed. This information, combined with the visual representation of a given layout of range station and airport, is invaluable in enabling a pilot to determine beforehand and to work out a safe and definite approach procedure, particularly with reference to the final approach to, and letting down to the field from, the range station. The indicator comprises a small tabulated disk 34 of transparent material pivoted at 35 to the panel 1 to be turned manually through a selected area 36 at the lower left hand corner of the panel. The area 36 of the transparent panel is provided with two sight openings or windows 37 and 38, through the former of which the computations on the disk 34 are exposed successively when the disk is rotated. The path traversed by the computations on the disk 34 is beyond the window 38 so that no exposure of the computations occurs at this window during the rotation of the disk.

Disk 34 is suitably marked off into a desired number of radial segments and each segment is divided into a pair of indicia frames 39 and 40. Thus, two relatively inner and outer circular sets or series of radially paired indicia frames are provided on the disk. The inner set of indicia frames 39 is marked to provide a scale or table of distances in miles and fractions thereof from the cone of silence of the range station to the airport and is appropriately identified at the window 37 by the legend 41. The outer set of indicia frames 40 is marked to provide a table of time factors in minutes and seconds of the time required to travel a given distance at a given airspeed; these time factors being correlated with the distance-factors of the distance-scale so that each distance factor and its corresponding time factor simultaneously are exposed at the window 37. The time factors of the outer set of indicia frames 40 are appropriately identified at the window 37 by the legends 42 and 43. The distance-time indicator may be designed for use at any given airspeed and over any selected range of time or distance. In the instant case, however, it is illustrated as having a distance range from one-quarter of a mile to five miles and a controlling airspeed factor of 100 miles per hour; the airspeed factor being indicated at 44. Hence, the disk 34 is shown with twenty indicia frames 39, each of which is marked with distance-indicating indicia representing a quarter-of-a-mile increase in distance over that represented by the distance-indicating indicia of the next preceding frame. The time required to travel the distance indicated in any one of the frames 39 is given in its associated frame 40 of the time factor table.

Positionally related to the distance-time indicator, although not functionally a part thereof, is a device for noting the instant signal received by the pilot when flying within the off-course zone or the bi-signal zone of either an A or N quadrant of a radio range system. It comprises a zone-noter disk 45 mounted beneath the distance-time indicator disk 34 and rotatably supported on the axis or pivot 35 of the latter disk to be turned manually. The letters A and N are marked or otherwise provided on the disk 45 at diametrically opposite points to be selectively exposed at the panel window 38; these letters being clearly visible through the transparent material of the disk 34. Contact between the panel 1 and the disk 34 is prevented by the interposition of a thin sheet 46 of transparent material and contact between the disks 34 and 45 is prevented by the interposition of a similar sheet 47. These sheets are apertured to receive the pivot 35 and are held against turning, during rotation of the disks, by a common connection 48 with the panel 1. When the zone noter is set to expose either the letter A or the letter N at the window 38, it serves to remind the pilot throughout the working of any orientation problem of the quadrant in which he is flying.

For recording pertinent data, a log-sheet is provided in the lower right hand corner of the panel as shown in Figure 1. For this purpose, the upper surface of the transparent material of the panel is etched or otherwise provided with a plurality of lined spaces 49 having appropriate headings for receiving the desired entries, for example, Destination, Radio wave length, Air speed, Time of departure, Estimated time of arrival, etc. A contrasting background 50, against which the markings and entries of the log-sheet are visible, is provided on the underside of the panel in underlying relation to the lined spaces of the log-sheet. Additional auxiliary units are a visual reference altimeter and a clock. These are located in the right and left hand corners respectively at the top of the panel. The clock comprises a clock-dial 51 inscribed or otherwise provided on the transparent material of the panel 1 and a pair of superposed transparent disks 52 and 53 concentric with the dial 51 and independently turnable about a common central axis or pivot 54. The upper disk 52 constitutes the minute-disk and is marked with an index arrow for reading the minutes and the lower disk 53 constitutes the hour-disk and has an index arrow for reading the hours. By manual operation, the disks 52 and 53 may be set to indicate any desired time such as the time of departure, estimated time of arrival, etc. The visual reference altimeter is similar in construction to the clock and differs therefrom in that the altimeter dial 55 is graduated from one to ten and the upper arrow-marked disk 56 when read against the graduations indicates the altitude in thousands of feet while the lower arrow-marked disk 57 when read against the graduations indicates the altitude in hundreds of feet. Upon the altimeter, the pilot may set up for visual reference the lowest indicated altitude for a given quadrant, as obtained from a radio facilities chart, to which the airplane can let down within a 10 mile radius of the range station and still maintain 1000 ft. clearance over the highest obstructions within the given area. Below the dials of the clock and the altimeter, suitable spaces 58 and 59 are provided for receiving entries identifying the respective readings. Frictional contact between the disks 52 and 53 of the clock is prevented by the interposed transparent member 60 and frictional contact between the disks 56 and 57 of the altimeter is prevented by the interposed transparent member 61. Members 60 and 61 are integral extensions of a transparent plate 62 affixed in a suitable manner to the back of the panel.

The radio range visualizing device constructed as described and illustrated herein lends itself most readily for use in conjunction with a new type of airplane instrument lighting now in general use in Air Corps airplanes. In this type of lighting, figures and indicators of each instrument are painted with a fluorescent paint and a special ultra-violet (dark light) lamp is focussed upon them. All the data and indicators of the radio range visualizing device, upon being painted with luminous paint and placed under the rays of the ultra-violet lamp, stand out because each part and data is on transparent material.

In the operation of the device, the beam-leg indicating disks and the airport direction locator disk are set to give a visual representation of the radio range system within which the pilot is flying and the identity of which previously has been established by reception over the radio of the station identification signal. Assuming, therefore, the layout of the given station is as depicted in Figure 11, a visual representation thereof is set up on the device by positioning the beam-legs disks and the airport disk according to the bearings indicated in the disclosed pattern of the range, which information is of course obtained from the radio facilities chart. The distance from the cone of silence to the airport is indicated as being three miles and this distance noted on the distance-time indicator by turning disk 34 until the number 3 appears at the left in window 37. At 100 miles per hour it requires one minute and forty-eight seconds to travel three miles. This is indicated by the figures 1.48 appearing at the right in window 37. Thus, the distance-time indicator not only gives the distance of the airport from the station but automatically resolves that distance into minutes and seconds from the station at a given airspeed. The pilot is thereby relieved of the necessity of mental computation to ascertain these facts when letting down for the field after final approach procedure and is able to concentrate more fully on the letting down procedure.

When an A or an N signal is heard, it is noted by turning the zone noter disk 45 until the appropriate letter is displayed in window 38. In the instant problem, it is assumed that the pilot is receiving an "A" signal which, according to the visual pattern of the range, means that he is flying either in the west quadrant or the east quadrant of the range. There are various well known systems of orientation by means of which a pilot can positively determine his location, any one of which may be worked out with and visually represented by the aid of the present invention. Certain systems require the determination of the average bisector of each pair of quadrants and the further operation of the device, as herein explained, is in accordance with one of such systems. Upon receiving the "A" signal, the pilot turns the average bisector disk 11 until the arrow 27 is set to the average bisector (260 degrees) of both "A" quadrants. The airplane is then headed in a course parallel to the average bisector in whichever direction (average bisector course 260 degrees or its reciprocal 80 degrees) the pilot believes best and the signal strength change is noted. The signals increase or decrease in volume depending on whether the airplane is getting closer to or farther away from the range station. On a heading of 260 degrees, an increase of signal strength occurs when the airplane is in the east quadrant of the range and coming toward the station, as represented at x in Figure 11. A decrease in signal volume on the same heading would occur only when the airplane is in the west quadrant and headed away from the station as represented at Y in Figure 11. On the reciprocal heading of 80 degrees, the signal strength increases only if the airplane is in the west quadrant and headed toward the station as indicated at Z in Figure 11, whereas the signal strength decreases only if the airplane is in the east quadrant and headed away from the station as indicated at W in Figure 11. Having noted the signal strength change and knowing the instant heading of the airplane, the pilot readily identifies the particular quadrant in which he is located and his direction of travel with respect to the station. If he finds that he is headed away from the station, he immediately turns 180 degrees and flies back toward the station. Having identified the quadrant in which he is flying, the pilot flies parallel to one leg to cross the other or desired leg. If the east leg is to be crossed, the pilot in the east quadrant turns to a heading of 238° which corresponds to the bearing of the other or northeast leg of the range. If the west leg is the desired leg, the airplane in the west quadrant is headed 53° corresponding to the bearing of the southwest leg of the range. These headings and bearings are visually represented to the pilot by the radio range visualizing device and enables him readily to apply the proper method and principles of range orientation. The lowest indicated altitude to which an airplane can let down in the east quadrant of the given range station represented in Figure 11 is 2500 feet. This altitude is set up on the visual reference altimeter for the guidance of the pilot.

Having crossed the desired leg, the pilot immediately turns toward the station or away from the station (predicated on the direction beam was approached in relation to the station) at an angle set up by the second barrier disk 12 so as to fly back toward the beam at a slight angle. This angle can be predetermined by the pilot with the aid of the range visualizing device. For example, it having been determined that on a heading of 238 degrees in the east quadrant the east leg will be intercepted, the barrier disk 12 is turned to set the arrow 31 on a heading of about 292 degrees. By putting the airplane on this heading immediately after crossing the east leg, the pilot will return to the beam at a slight angle. To mark the desired leg on which the pilot is working, the leg marker disk 10 is turned to set the winged arrow 24 over the desired leg, as shown in Figure 1. Then, while flying the course set up by the barrier disk 12, the pilot turns the average-bisector disk 11 until the arrow 27 is on a heading of 258 degrees, thus setting up a course leading away from the beam at a slight angle. The bisector-barrier disk 11 and the barrier disk 12 enable the pilot visually to set his courses in relation to the beams so as to properly get on the leg desired. With these barrier disks, a pilot may plot and work out visually any type of approach problem he deems most applicable. By means of these markers, he sets up a visual barrier consisting of two courses beyond which he will not position his airplane. These two courses bracket the beam and set up limiting headings for enabling the pilot to stay on the beam and automatically take care of any drift encountered. Of much added value, particularly during the first stages of orientation problems or approach procedures, is the fact that when once a course is established, one of the barrier disks is used to indicate the course and the other enables the pilot visually to lay out his next course.

After continuing on the beam and passing through the cone of silence of the range station on the initial approach, the pilot immediately proceeds out on the southwest leg, as indicated in Figure 11 at R, makes a standard procedure turn at S and flies back through the cone of silence in preparation for a letting down to the airport.

After passing through the range station on the final approach, the airplane is let down in a well controlled power glide usually from 1000 feet over the range station to a minimum altitude for a given station and within a specified time limit. In the ideal layout, a leg of the range passes directly over the airport as depicted in Figure 11 but in most cases the leg passes to either side of the airport and the pilot uses the type of let down procedure which is thought best adapted for the occasion. In this connection, the airport direction locator disk 9 and the distance-time indicator are valuable aids in visually representing to the pilot the location of the airport with respect to the range pattern, its distance from the station as resolved into time, and such other facts and information as will enable him to determine upon and to use or work out a proper procedure approach to the airport.

The barrier courses for the pilot flying in the west quadrant of the range system, as set up on the radio range visualizing device, would be 125 degrees and 91 degrees respectively as represented in Figure 11. After crossing over the station from the west leg (108 degrees), the pilot turns right to a west heading, as at T, and maintains that heading until the southwest leg (53 degrees) is encountered at which time the pilot turns left and proceeds out upon the southwest leg, makes the standard procedure turn at S and flies back toward the station and the airport.

Having thus described the invention, what is claimed as new is:

1. A radio range visualizing device comprising a compass rose, and a plurality of superposed indicator members of transparent material pivoted on a common axis at the center of the compass rose and independently rotatable, said indicator members including four beam-leg indicating disks positionable to a given bearing on the compass rose for setting up a pattern of a given beam station, an airport locator disk positionable with respect to a given compass bearing for setting up a given location of the airport with respect to the beam station, a leg-marker disk positionable to indicate a given or desired beam leg, and a pair of barrier disks positionable with respect to a given beam leg and certain compass bearings for setting up barrier courses bracketing a beam, one of said barrier disks serving also as a quadrant average bisector indicator.

2. A radio range visualizing device comprising a supporting member having a compass rose, and a plurality of superposed indicators pivoted on a common axis at the center of the compass rose and grouped on relatively opposite sides of the supporting member, said indicators being independently rotatable for setting up a pattern of a given radio range station and for indicating courses thereon, said indicators having individual distinguishing and identifying markings thereon whereby collectively they provide four beam-representing members positionable to a given bearing on the compass rose—an airport locator member positionable with respect to a given compass bearing—a beam marker member positionable to indicate a given or desired beam leg—a combined quadrant average-bisector-and-barrier indicator member and—a second barrier indicator member, said barrier indicator members being positionable with respect to a given beam leg and certain compass bearings, the said supporting member and the said indicators being of transparent material so that the markings on the members of each group are visible through the members of the other group.

3. A radio range visualizing device comprising a supporting member having a compass rose, a plurality of beam indicator members pivoted on a common axis at the center of the compass rose and independently adjustable with respect thereto to be positioned along selected bearings to represent the beams of a given radio range station, an airport-representing member adjustable with respect to the compass rose and the beam indicators for visually representing the relative position of the airport, a beam-marker member adapted to be positioned over a selected beam-indicator, and an average-bisector course indicator adjustable with respect to the compass rose and the other members to be positioned relative thereto for representing an orientation course.

4. A radio range visualizing device having in combination a compass rose, a plurality of indicators representing the beams of a radio range beacon and independently adjustable with respect to the compass rose, a beam-marker member adjustable about the axis of the compass rose to be positioned in designatory relation with respect to a selected one of the beam-representing indicators, and a pair of independently movable barrier-indicating members for setting up barrier courses bracketing a beam represented by a selected one of said beam-representing indicators.

5. A radio range visualizing device having in combination a compass rose, a plurality of indicators representing the beams of a radio range beacon and independently adjustable with respect to the compass rose for providing a visual representation of the range pattern of a given range system, an airport-representing member adjustable with respect to the compass rose and the said indicators for indicating the relative position of the airport in the given range system, and a pair of independently adjustable barrier-indicating members for setting up barrier courses bracketing a beam represented by a selected beam-representing indicator, one of said barrier-indicating members being usable also as a quadrant average bisector indicator to be positioned within a selected pair of quadrants for visually representing the orientation course for said quadrants.

6. A radio range visualizing device having in combination a compass rose, a plurality of radio beam-representing members adjustable with respect to the compass rose to be relatively positioned in visual representation of the beams of a given ratio range beacon, and a pair of independently adjustable movable barrier-indicating members adjustable with respect to the compass rose and the beam-representing members for visually setting up barrier courses bracket a beam.

7. A radio range visualizing device having, in combination, a supporting member provided with a compass rose, and a plurality of independently adjustable disks of transparent material pivoted to the member for rotation about a common axis at the center of the compass rose and having individual distinguishing and identifying markings thereon whereby collectively they provide four beam-representing disks positionable to a given bearing on the compass rose in visual representation of the beam layout of a given range pattern and a pair of barrier-representing disks positionable with respect to a given beam leg and certain compass bearings for visually representing barrier courses bracketing the beam.

8. A radio range visualizing device comprising a supporting member having a compass rose, and a plurality of independently adjustable disks of transparent material pivotally mounted on the supporting member for rotation about a common axis at the center of the compass rose, said disks having individual distinguishing and identifying markings thereon whereby collectively they provide four beam-representing members positionable to a given bearing on the compass rose to set up a visual representation of a given range pattern and a quadrant average-bisector indicator member positionable to a selected bearing on the compass rose for visually representing the average bisector course for a selected pair of quadrants of the given range pattern, each of the said beam-representing members being provided with a radially extending wedge-shaped marking representing a beam of a radio range station, and the said quadrant average-bisector indicator member being marked with an arrow-like bisector line extending diametrically of the member, the said supporting member and the said disks being transparent.

WILLIAM J. CHAPMAN.